(12) United States Patent
Durth et al.

(10) Patent No.: US 8,982,525 B2
(45) Date of Patent: Mar. 17, 2015

(54) OVERVOLTAGE PROTECTION EQUIPMENT

(75) Inventors: Rainer Durth, Horn-Bad Meinberg (DE); Thomas Meyer, Ottenstein (DE); Joachim Cerny, Bielefeld (DE)

(73) Assignee: Phoenix Contact GmbH & Co. KG (DE)

( * ) Notice: Subject to any disclaimer, the term of this patent is extended or adjusted under 35 U.S.C. 154(b) by 211 days.

(21) Appl. No.: 13/593,919

(22) Filed: Aug. 24, 2012

(65) Prior Publication Data

US 2013/0063845 A1   Mar. 14, 2013

(30) Foreign Application Priority Data

Sep. 8, 2011   (DE) .......................... 10 2011 053 415

(51) Int. Cl.
*H02H 9/06*   (2006.01)
*H01C 7/12*   (2006.01)

(52) U.S. Cl.
CPC ........................................ *H01C 7/12* (2013.01)
USPC ............ 361/111; 361/112; 361/125; 361/129

(58) Field of Classification Search
USPC ........ 361/111, 112, 128, 129, 130, 124, 93.7, 361/93.8
See application file for complete search history.

(56) References Cited

U.S. PATENT DOCUMENTS

| | | | |
|---|---|---|---|
| 4,023,071 A * | 5/1977 | Fussell .............................. | 361/56 |
| 4,583,146 A * | 4/1986 | Howell ............................. | 361/13 |
| 4,586,104 A * | 4/1986 | Standler .......................... | 361/119 |
| 4,630,163 A * | 12/1986 | Cooper et al. .................... | 361/56 |
| 4,652,963 A * | 3/1987 | Fahlen ............................... | 361/16 |
| 4,937,696 A * | 6/1990 | Yoshino et al. .................... | 361/11 |
| 4,967,176 A * | 10/1990 | Horsma et al. .............. | 338/22 R |
| 6,266,223 B1 * | 7/2001 | Curry ............................. | 361/119 |
| 7,498,763 B2 * | 3/2009 | Weigel ........................... | 318/778 |
| 7,755,873 B2 * | 7/2010 | Crevenat et al. ............. | 361/91.1 |
| 7,933,106 B2 * | 4/2011 | Brown et al. ................... | 361/111 |
| 2002/0030958 A1 * | 3/2002 | Baarman et al. .............. | 361/119 |
| 2005/0041349 A1 * | 2/2005 | Birkholz et al. ............. | 361/91.1 |
| 2009/0021881 A1 * | 1/2009 | Crevenat ....................... | 361/111 |
| 2011/0013330 A1 * | 1/2011 | Crevenat et al. .............. | 361/115 |
| 2012/0243138 A1 * | 9/2012 | Cerny et al. .................. | 361/93.8 |
| 2014/0029149 A1 * | 1/2014 | Schimanski et al. ......... | 361/93.7 |

FOREIGN PATENT DOCUMENTS

DE   10 2007 015 933 A1   7/2008

* cited by examiner

*Primary Examiner* — Thienvu Tran
*Assistant Examiner* — Angela Brooks
(74) *Attorney, Agent, or Firm* — Knobbe, Martens, Olson & Bear LLP

(57) ABSTRACT

Overvoltage protection equipment may include: a first connection; a second connection; a first discharge path disposed between the first and the second connections, wherein the first discharge path comprises a spark gap; a second discharge path disposed between the first and the second connections, wherein the second discharge path comprises a triggerable circuit breaker and a thermistor connected in series; and a control device that induces the triggerable circuit breaker to switch on, based on at least one of a state or a state path of the first discharge path as a result of a discharge event.

12 Claims, 1 Drawing Sheet

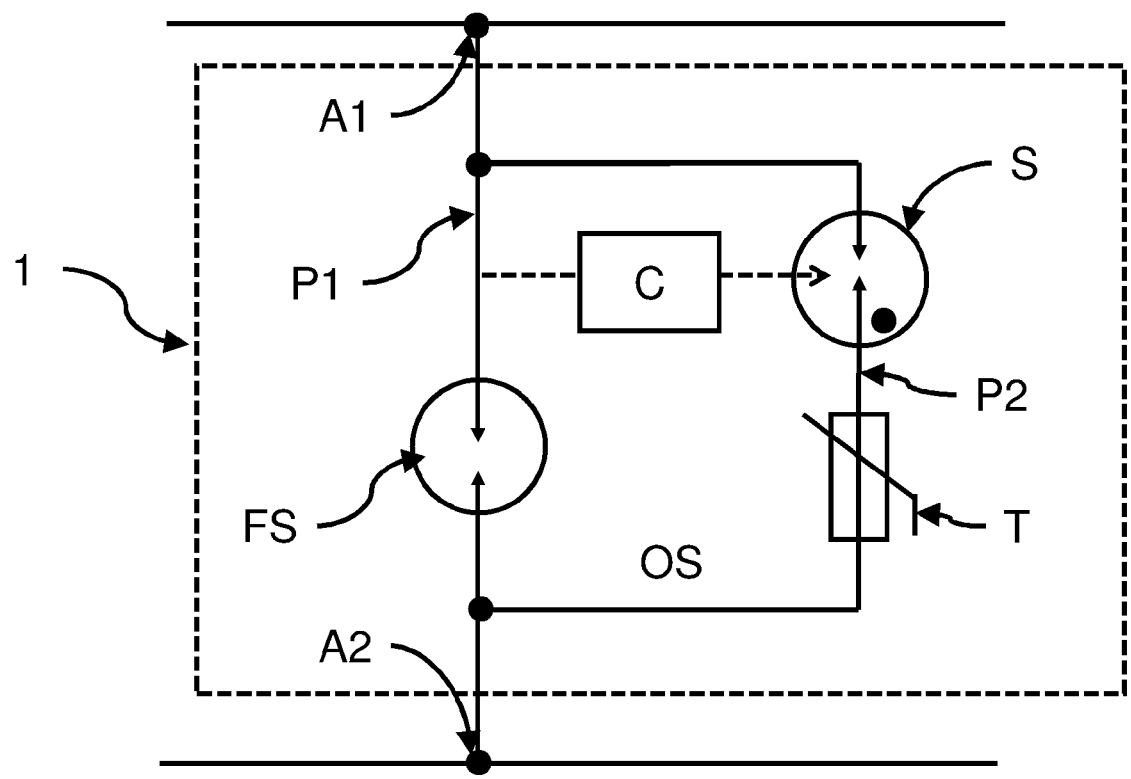

OVERVOLTAGE PROTECTION EQUIPMENT

CROSS-REFERENCE TO RELATED APPLICATIONS

The invention concerns overvoltage protection equipment. This application claims priority under 35 USC §119 to German Patent Application No. 10 2011 053 415.6, filed on Sep. 8, 2011 with the German Patent and Trademark Office, the contents are herein incorporated by reference in its entirety.

BACKGROUND

The invention concerns overvoltage protection equipment. This application claims priority under 35 USC §119 to German Patent Application No. 10 2011 053 415.6, filed on Sep. 8, 2011 with the German Patent and Trademark Office, the contents are herein incorporated by reference in its entirety. Overvoltage protection equipment, in particular Type 1, are used in efficient electrical power grids. This overvoltage protection equipment represents coarse protection in the building feed and will, for example, draw off the stored energy of lightning and can limit the remaining residual stress to a value less than 1300 to 6000 V. This stress is displayed due to a reference current surge. This reference current surge exhibits a current of 50 or 100 kA, for example, with a 10/350-μsec pulse shape. Another pulse shape is, by way of example, the 8/20 μsec pulse shape. Overvoltage protection is thereby ensured for potential rectification, in which the maximum voltage difference between feeds at a specified protection level must not be exceeded. For this purpose, varistors and spark gaps have been used in the past. The advantage of spark gaps is in the low operating arc voltage, which defines the protection level with simultaneously high surge current capacity. This advantage is, however, associated with a decided drawback. Spark gaps also exhibit, based on the low operating arc voltage, poor ability to limit and extinguish the secondary currents. Typically, the spark gaps first go out when the current decreases below the so-called holding current, e.g. at zero passage of an alternating-current voltage. For this purpose, this property leads to tripping series-connected fuses and therefore compromising the availability of a protected system, because now the fuses first have to be replaced.

To resolve this problem, in the past, spark gaps were provided with an elevated operating arc voltage, which thereby are better for suppressing the secondary current at the site. This increase is achieved by cooling the arc or by means of a high pressure build-up in the spark gap or by arc multiplication. These spark gaps, however, exhibit a drawback, in that they exhibit severely increased power conversion, which is an obstacle to the small sizes required. A further disadvantage is that these spark gaps are comparatively expensive.

BRIEF SUMMARY

The invention is based on the problem of making an improved arrangement available, which resolves the known disadvantages of spark gaps with low operating arc voltage, without taking the drawbacks of spark gaps with increased operating arc voltage into account.

The solution to the problem occurs according to the invention through the features of the independent claims. Advantageous embodiments of the invention are cited in the subclaims.

The invention is clarified in detail hereinafter with reference to the attached drawing with the aid of preferred embodiments.

BRIEF DESCRIPTION OF THE DRAWING

FIG. 1 is a schematic representation of overvoltage protection equipment according to a preferred embodiment of the invention.

DETAILED DESCRIPTION

FIG. 1 shows overvoltage protection equipment 1. This overvoltage protection equipment 1 is indicated as a dashed-line rectangle. The overvoltage protection equipment 1 exhibits in general form a first connection A1 and a second connection A2, which are disposed on the feeds for electrical equipment. Between the first connection A1 and the second connection A2 are a first discharge path P1 and a second discharge path P2. This first discharge path P1 and this second discharge path P2 for a parallel circuit. Further alternative parallel discharge paths can be provided.

The first discharge path P1 exhibits a spark gap FS. The second discharge path exhibits in the most general form a triggerable circuit breaker S and a thermistor T. The triggerable circuit breaker S and the thermistor T are connected in series. In addition, the overvoltage protection equipment 1 exhibits a control device C, which, based on the state and/or the state path of the first discharge path P1 as a result of a discharge event, which induces the triggerable circuit breaker S to switch on.

A surge current ignites the spark gap FS. This state change is recognized by the control device C. In addition, the control device C can recognize the current path over time through the discharge path P1. If the pulse-shaped current (transient event) is substantially suppressed and the current through P1 is now essentially carried through the secondary current, the control device C induces the triggerable circuit breaker S to switch on. This can, for example, be time-delayed after recognition of the case of a discharge is induced. The discharge path P2 is hereby activated. Because the thermistor T is cold initially, the thermistor has low resistance. The majority of the current or the total current is hereby commutated from discharge path P1 to discharge path P2. This leads to the current decreasing in the discharge path P1 below the holding current for the spark gap FS and current flow thereby being interrupted in the discharge path P1. Further current flow in the discharge path P2 leads to the thermistor T heating up. As a result of the heating of the thermistor T, the resistance of thermistor T rises. As a result thereof, the voltage at the thermistor rises, while the voltage at the circuit breakers in series decreases. Depending on the type of triggerable circuit breaker S, the current in the discharge path P2 now falls below a holding current of the triggerable circuit breaker S or the voltage at the circuit breaker falls below a holding current and thus leads to passive extinction of the secondary current, or else the current in the discharge path P2 is reduced so much, or is limited due to the rise in the resistance at the thermistor T, that the current, under the influence of the control device, is actively extinguished by switching the circuit breaker S off. Because the thermistor T is first utilized when the current still ultimately corresponds essentially to the secondary current, the thermistor T can be designed for lower currents, so that cost-effective thermistors T can be used. In addition, because lower requirements now have to be set for the specific extinction capability, the spark gaps FS can also fall back on cost-effective spark gaps.

In a simple manner, a circuit for overvoltage protection equipment is thereby made available, which exhibits, for one thing, the advantage of a spark gap and for another thing too, favorable cancellation of the secondary current and its ability to extinguish the secondary current are made available.

In a particularly preferred manner, the thermistor T can be designed as positive temperature coefficient (PTC), without being limited to a specific type of design, such as a ceramic or conductive polymer, for example. However, other thermistors can be used alternatively. Especially preferred are thermistors T, which exhibit a resistance in the cold state of less than 1Ω, for example less than 500 mΩ.

In addition, the thermistor T can preferably be of such dimensions that current flow through the thermistor T heats it up so much that the current is limited.

In an especially preferred embodiment, the circuit breaker S is a triggerable overvoltage discharge device (ÜSAG).

In addition, the control device C can, alternatively or additionally, be so designed that it recognizes that a discharged current decreases relative to magnitude.

In a further preferred embodiment, the control device C can recognize, with the aid of a measured voltage level and/or a heating profile and/or frequency components in the discharge path, that the triggering of the discharge path P2 should be induced.

It can thereby still be precisely determined when a pulse event is essentially at an end and the current is actually predominantly a secondary current.

Alternatively or additionally, it can be provided in one embodiment of the invention that the control device C induces a time-delayed switch-on. If the control device C, for example, is provided for that purpose that it monitors both the path over time and the discharge event, it can be provided that the circuit breaker S is always triggered as a back-up method after onset of a discharge event. Thus this (forced) triggering is selected temporally so that the point in time is used as a rule after the expected use of a triggering as a result of recognized subsidence of a pulsed current and after the recognition that the current is essentially carried by a secondary current, that is, as a rule the circuit breaker S should already be triggered. Then, if for any reason the recognition of the secondary current is faulty, the circuit breaker, controlled temporally, is activated, based on the (forced) triggering, and the extinction of the spark gap FS is initiated in the discharge path.

| Reference list | |
|---|---|
| Overvoltage protection equipment | 1 |
| First connection | A1 |
| Second connection | A2 |
| First discharge path | P1 |
| Second discharge path | P2 |
| Spark gap | FS |
| Triggerable circuit breaker | S |
| Thermistor | T |
| Control device | S |

The invention claimed is:

1. An overvoltage protection equipment, comprising:
a first connection;
a second connection;
a first discharge path between the first and second connections, wherein the first discharge path comprises a spark gap;
a second discharge path between the first and second connections, wherein the second discharge path comprises a triggerable circuit breaker and a thermistor connected in series; and
a control device electrically connected to first and second discharge paths and configured to induce the triggerable circuit breaker to switch on, based on at least one of a state or a state path of the first discharge path as a result of an ignition event of the spark gap,
wherein the control device is configured to determine that the triggerable circuit breaker should be induced based at least on one of a measured voltage level, a heating profile or a frequency component of the first discharge path.

2. The overvoltage protection equipment according to claim 1, wherein the thermistor has a positive thermal coefficient (PTC).

3. The overvoltage protection equipment according to claim 1, wherein the thermistor has dimensions such that current flow through the thermistor heats it up sufficiently that the current is limited.

4. The overvoltage protection equipment according to claim 1, wherein the circuit breaker is a triggerable overvoltage discharge device (ÜSAG).

5. The overvoltage protection equipment according to claim 1, wherein the control device is configured to recognize when a discharged current decreases in magnitude.

6. The overvoltage protection equipment according to claim 1, wherein the control device induces a time-delayed on switch.

7. The overvoltage protection equipment according to claim 1, wherein the control device is configured to detect whether a current to be discharged is a secondary current and then induce the triggerable circuit breaker to switch on.

8. An overvoltage protection device, comprising:
a first input terminal and a second input terminal, wherein the first and second input terminals are configured to receive a transient electrical stimulus therebetween;
a first discharge path electrically connecting first and second input terminals and comprising a spark gap that is configured to discharge in response to the transient electrical stimulus;
a second discharge path electrically connecting the first and second input terminals and comprising a circuit breaker and a thermistor connected in series; and
a controller connected to and between the first and second discharge paths, wherein the controller is configured to detect a discharge event of the spark gap and subsequently cause the circuit breaker to switch on, thereby activating a current flow through the second discharge path including the thermistor.

9. The overvoltage protection device according to claim 8, wherein the thermistor has a positive temperature coefficient and is configured such that the electrical resistance of the thermistor increases proportionally with the magnitude of the current flow through the thermistor.

10. The overvoltage protection device according to claim 9, wherein the thermistor has an initial cold state resistance of less than 1 Ohm.

11. The overvoltage protection device according to claim 10, wherein the overvoltage protection device is configured such that after receiving the transient electrical stimulus, in response to a residual stress of less than about 6000V between the first and second terminals, an increase in the electrical resistance of the thermistor decreases the magnitude of the current flow through the circuit breaker below a holding current of the circuit breaker, thereby causing the current flow through the second discharge path to be extinguished.

12. The overvoltage protection device according to claim 8, wherein the controller is further configured to induce a time delay between detecting the discharge event and causing the circuit breaker to switch on.

* * * * *